United States Patent

Olsen

(10) Patent No.: US 9,773,301 B2
(45) Date of Patent: *Sep. 26, 2017

(54) SYSTEMS AND METHODS FOR PRODUCING TEMPERATURE ACCURATE THERMAL IMAGES

(71) Applicant: Eric Olsen, Bountiful, UT (US)

(72) Inventor: Eric Olsen, Bountiful, UT (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/136,358

(22) Filed: Apr. 22, 2016

(65) Prior Publication Data

US 2016/0343118 A1    Nov. 24, 2016

Related U.S. Application Data

(63) Continuation of application No. 14/212,527, filed on Mar. 14, 2014, now Pat. No. 9,324,138.

(Continued)

(51) Int. Cl.
*G06T 5/00* (2006.01)
*G06T 5/50* (2006.01)
*G06T 5/40* (2006.01)

(52) U.S. Cl.
CPC ............... *G06T 5/50* (2013.01); *G06T 5/009* (2013.01); *G06T 5/40* (2013.01);

(Continued)

(58) Field of Classification Search
CPC ............ G06T 5/50; G06T 2207/20221; G06T 2207/20021; G06T 5/007; G06T 5/009; G06T 2207/20192; G06T 5/001; G06T 5/40; G06T 5/20; G09G 2320/06; G09G 2320/066; G09G 2320/0693; H04N 17/04

See application file for complete search history.

(56) References Cited

U.S. PATENT DOCUMENTS 7,171,328 B1   1/2007  Walker
8,094,886 B1   1/2012  Roskovensky (Continued)

FOREIGN PATENT DOCUMENTS

JP        2009244083        10/2009

OTHER PUBLICATIONS

USPTO Non-final Office Action; U.S. Appl. No. 14/519,362; dated Apr. 28, 2017.

*Primary Examiner* — Todd Buttram
(74) *Attorney, Agent, or Firm* — Justin K. Flanagan

(57) ABSTRACT

Aerial thermal images of a ground surface may be captured using a thermal image sensor. The images may be contrasted, georeferenced, orthorectified, and/or stitched together to form a complete thermal image. The complete thermal image may include a plurality of pixels with display values corresponding to temperatures of the ground. Local temperature sensors may measure the temperature at locations on the ground. Based on display values for pixels corresponding to the locations on the ground and the temperature measurements, a curve mapping display values to temperature measurements may be calculated. Temperatures may be calculated for pixels for which the temperature was not previously known. Users may select a temperature range of interest, and pixels with temperature values within the temperature range of interest may be distinctively marked. The pixels may be marked with different colors based on where their temperature value falls within the temperature range of interest.

20 Claims, 8 Drawing Sheets

Related U.S. Application Data

(60) Provisional application No. 61/893,687, filed on Oct. 21, 2013.

(52) U.S. Cl.
CPC ............... *G06T 2207/10024* (2013.01); *G06T 2207/10032* (2013.01); *G06T 2207/10048* (2013.01); *G06T 2207/20221* (2013.01); *G06T 2207/30184* (2013.01); *G06T 2207/30188* (2013.01)

(56) References Cited

U.S. PATENT DOCUMENTS

| | | |
|---|---|---|
| 8,824,828 B1 | 9/2014 | Winn |
| 2006/0020563 A1 | 1/2006 | Coleman |
| 2007/0036405 A1 | 2/2007 | Lienard et al. |
| 2007/0229443 A1 | 10/2007 | Sawada et al. |
| 2008/0095212 A1 | 4/2008 | Jonnalagadda |
| 2008/0144905 A1 | 6/2008 | Tallman |
| 2008/0310752 A1 | 12/2008 | Han et al. |
| 2009/0080753 A1 | 3/2009 | De Villiers |
| 2010/0012840 A1 | 1/2010 | King |
| 2010/0296694 A1 | 11/2010 | Little et al. |
| 2011/0001809 A1 | 1/2011 | McManus |
| 2011/0013834 A1 | 1/2011 | Hsu |
| 2012/0219214 A1 | 8/2012 | Bao |
| 2012/0274778 A1 | 11/2012 | Knight |
| 2013/0188058 A1 | 7/2013 | Nguyen |
| 2014/0016667 A1 | 1/2014 | Sanderson |
| 2014/0148705 A1 | 5/2014 | Linn |
| 2015/0019185 A1 | 1/2015 | Cunningham |
| 2016/0065848 A1 | 3/2016 | LeBeau |

SYSTEMS AND METHODS FOR PRODUCING TEMPERATURE ACCURATE THERMAL IMAGES

TECHNICAL FIELD

This disclosure relates to systems and methods for producing thermographs with accurate temperature values.

DETAILED DESCRIPTION OF PREFERRED EMBODIMENTS

A manned or unmanned aerial vehicle may capture aerial thermal images of the ground using a thermal image sensor. The thermal image sensor may be a radiometric thermal image sensor that estimates a temperature value for each pixel in the captured image. For example, the radiometric thermal image sensor may include a plurality of electromagnetic (EM) radiation sensors (e.g., one for each pixel) that change electrical resistance based on the amount of radiation received. The electrical resistance of the EM radiation sensors may be used to estimate the temperature for each pixel, for example, by comparing measured resistances with a lookup table. However, the temperature estimates from the thermal image sensor may be inaccurate. A non-uniform correction (NUC) may calibrate EM radiation sensors to correct for differences among them. To perform the NUC, the thermal image sensor may sense an object with a uniform temperature and correct for differences among the measurements by the EM radiation sensors. While the NUC may correct for differences among the EM sensors, the estimated temperatures may still be off by several degrees because of the large distance between the aerial vehicle and the ground and because the thermal image sensor may not know the actual temperature value of the object with uniform temperature.

Figure 1:
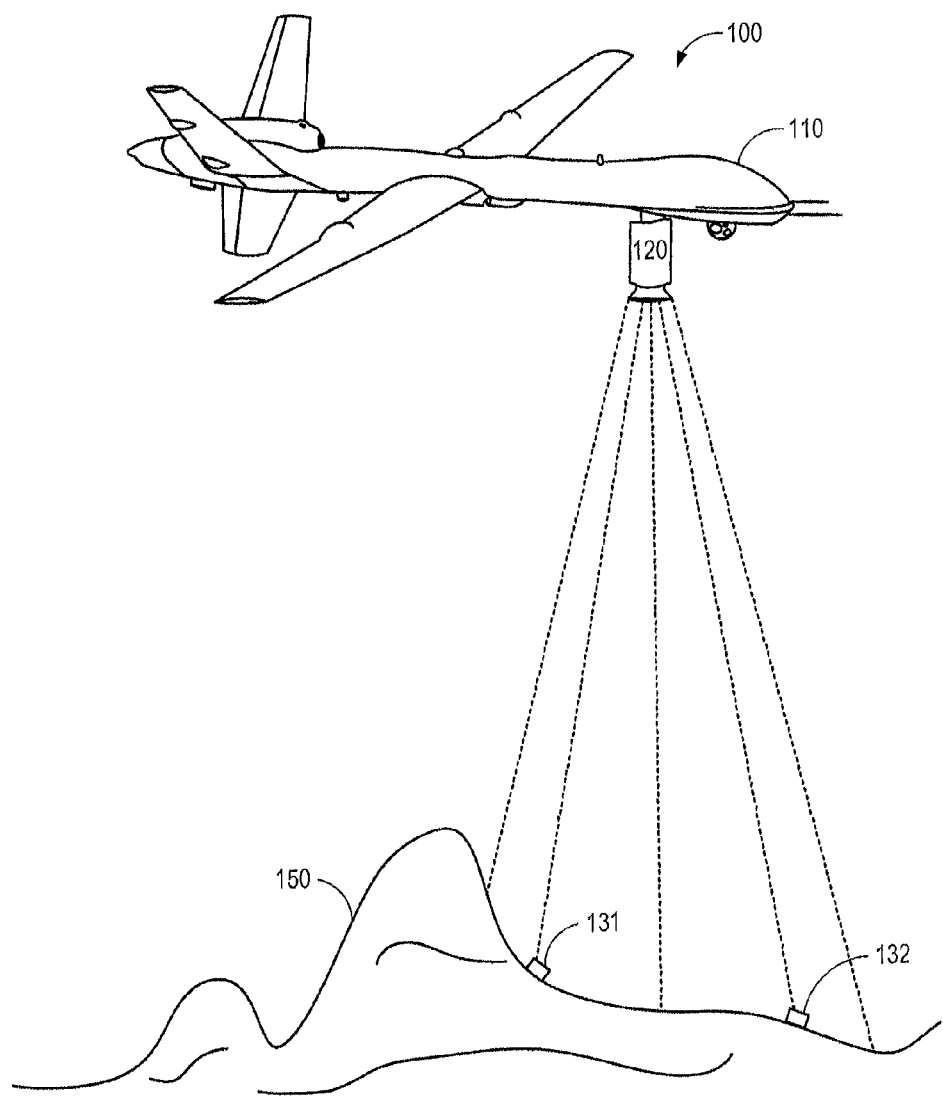
FIG. 1 is a perspective view of an aerial vehicle capturing aerial thermal images of the ground.

FIG. 1 is a perspective view of an aerial vehicle 110 capturing aerial thermal images of the ground 150. The aerial vehicle 110 may be an airplane, helicopter, unmanned aerial vehicle, remotely piloted vehicle, satellite, kite, balloon (e.g., hot air, weather, etc.), airship, glider, parasail, paraglider, and/or the like. The aerial vehicle 110 may use a thermal image sensor 120 to capture a plurality of constituent images that can be stitched together to form a thermal image of an area of interest and/or to capture a single thermal image. A plurality of local temperature sensors 131, 132 (e.g., thermometers) may detect the temperature at their location. The plurality of local temperature sensors 131, 132 may periodically measure and record the surface temperature of the ground. For example, the local temperature sensors 131, 132 may measure the temperature every 30 seconds, one minute, two minutes, three minutes, four minutes, five minutes, 10 minutes, 15 minutes, and/or the like. The local temperature sensors 131, 132 may be configured to have the surface temperature measurements mildly influenced by the air temperature. The local temperature sensors 131, 132 may also be configured to measure and record humidity, sunlight intensity, geographic location (e.g., using a geodetic satellite system, such as the Global Positioning System (GPS)) and/or the like and may record time stamps with the measured data. The aerial vehicle 110 may measure and record altitude, air density, local temperature, humidity, and/or the like. The local temperature sensors 131, 132 may be placed in known locations and/or the locations of the local temperature sensors 131, 132 may be known from geographic coordinate measurements (e.g., geographic coordinate measurements by the local temperature sensors 131, 132).

Figure 2:
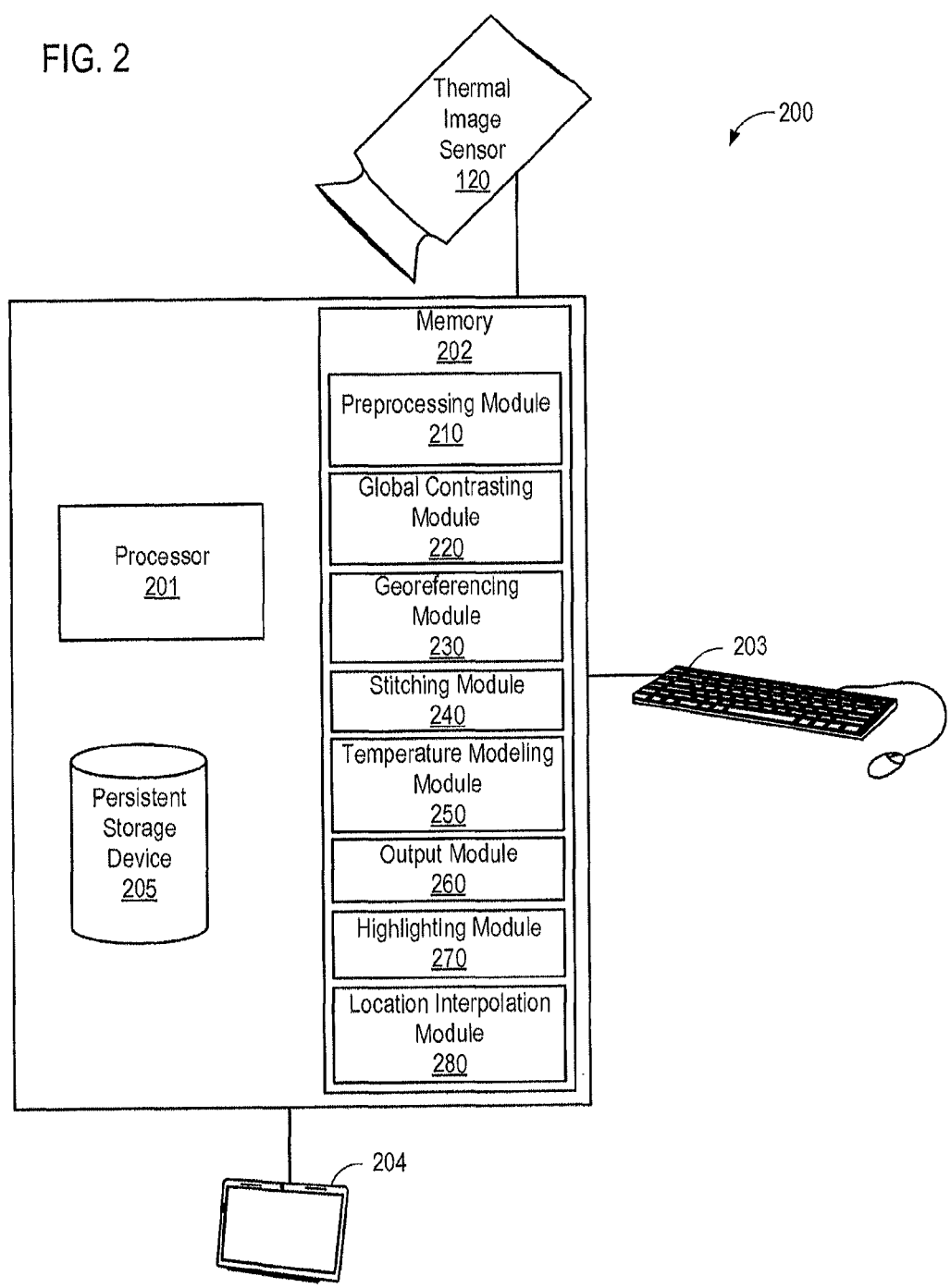
FIG. 2 is a schematic diagram of a system for producing temperature accurate thermal images.

FIG. 2 is a schematic diagram of a system 200 for producing temperature accurate thermal images. The system 200 may include a processor 201, a memory 202, an input device 203, an output device 204, a persistent storage device 205 (e.g., a persistent, computer-readable storage medium), and/or the like. The memory 202 may include a plurality of modules (e.g., modules 210-280) configured to cause the processor to perform steps contained therein. The system 200 may be communicatively coupled to the thermal image sensor 120 from which the system 200 may receive captured thermal images for processing. For illustrative purposes, the system 200 is depicted as a single unit with one processor 201 and one memory; however, the system 200 may be split among several processors and/or memories in other embodiments. For example, the modules may be located on a server, a client, and/or split between a server and client; a user may access the server through a network.

The thermal image sensor 120 may record captured thermal images as a plurality of temperatures. The captured thermal images may be communicated from the thermal image sensor 120 to the system 200 and/or may be manually transferred from the thermal image sensor 120 to the system 200. A preprocessing module 210 may convert the plurality of temperatures in the thermal images into display values that can be rendered by a computer system. The display values may be grayscale values, color values, and/or the like and may be expressed in any format (e.g., an RGB triplet, a compressed image format, and/or the like).

The mapping from temperature to display value may vary among the constituent thermal images. Accordingly, a global contrasting module 220 may modify the display values to have a consistent mapping from temperature to display value for all the constituent thermal images. Systems and methods for global contrast correction are disclosed in U.S. patent application Ser. No. 14/212,527 (titled "Global Contrast Correction"), which is hereby incorporated by reference herein in its entirety. The global contrasting module 220 may modify the display values so that one or more statistical characteristics of the constituent thermal images are consistent. The one or more statistical characteristics may include a mean, median, mode, absolute maximum, average maximum, absolute minimum, average minimum, moment, etc. Alternatively, or in addition, the global contrasting module 220 may select a mapping from temperature to display value for which the inverse is easily computed. In some embodiments, the mapping from temperature to display value may introduce quantization error, but the inverse may be injective. The temperature-to-display value mapping may be selected so the inverse is a linear function, a polynomial function, a Gaussian cumulative distribution function, a monotonic function, and/or the like.

A georeferencing module 230 may georeference and/or orthorectify constituent thermal images (e.g., the globally contrasted constituent thermal images). The constituent thermal images captured by the thermal image sensor 120 may be captured at various angles other than directly overhead; a lens for the thermal image sensor 120 may produce lens distortion and/or fisheye effects; and/or there may be variations in the elevation of the ground. As a result, the images may distort spatial distances (e.g., the same distance at different locations on the globally contrasted thermal image may correspond to different distances on the ground). Orthorectification may correct for variations in distance and/or the size and shape of objects that result from the perspective of the camera. The resulting corrected image may appear to be substantially similar to an image taken from directly overhead. Multiple constituent thermal images of the same area may be used to provide the information needed for orthorectification. For example, an angled image of a building may block thermal information about locations behind the building. The angled image may be manipulated so the building no longer blocks the locations behind the building, and the missing thermal information may be determined from one or more other images. In some embodiments, the constituent thermal images may be sufficiently overhead and/or the terrain sufficiently flat that orthorectification is not needed.

Georeferencing may be used to remove distortion of spatial distances. Features in the globally contrasted constituent thermal images may be aligned to a spatially accurate base map. Points on the thermal images with known locations may be fixed, and other points may be manipulated so that the known points may be fixed in the proper locations. Geographic coordinates for the known points may be known, so geographic coordinates for the other points may be determined from the known geographic coordinates. Orthorectification and georeferencing may include stretching and/or skewing the globally contrasted constituent thermal images and/or adding and/or deleting pixels from the thermal images. Added pixels may be taken from other constituent thermal images.

A stitching module 240 may combine constituent thermal images (e.g., the georeferenced and orthocorrected constituent thermal images) to form a complete thermal image of the area of interest. The constituent thermal images may overlap, so the stitching module 240 may use only some constituent images and/or portions of images to form the complete thermal image. A user may indicate which constituent images and/or portions of images should be used, and/or the stitching module 240 may use a stitching algorithm. The stitching module 240 may align images using a correlation function (e.g., the sum of absolute differences between pixel values), using known geographic coordinates of pixels and/or image features determined from georeferencing, and/or the like. In some embodiments, the stitching module 240 may be omitted (e.g., when a single thermal image is captured rather than a plurality of thermal images). Additional global contrasting may be performed once the complete thermal image has been stitched and/or during stitching.

A temperature modeling module 250 may create a temperature model for a thermal image (e.g., the stitched thermal image; an individual, non-stitched thermal image; and/or the like). The temperature model may map display values in the thermal image to accurate temperature values. As previously discussed, the mapping from temperature to display value used by the global contrasting module 220 may be selected to have an easily computable, injective inverse. A curve with the same form as the inverse may be fitted and used as the temperature model by the temperature modeling module 250. The temperature modeling module 250 may find the best fit curve using the measurements by the local temperature sensors 131, 132 and the temperature model. Because the exact locations of the local temperature sensors 131, 132 may be known, the locations of corresponding pixels in the thermal image may be determined. The corresponding pixels may be referred to as known-temperature pixels. The display values for the known-temperature pixels and the corresponding temperature measurements from the local temperature sensors 131, 132 may be used to create the best fit curve. For example, the best fit curve may minimize the least squared error between the curve and the display value, temperature measurement pairs.

An output module 260 may display a thermal image (e.g., the stitched thermal image; an individual, non-stitched thermal image; and/or the like) to a user using the output device 204. The output module 260 may allow the user to manipulate the thermal image, such as by zooming in, zooming out, zooming to a window, zooming to fit the whole thermal image, moving the thermal image, rotating the thermal image, and/or the like. The output module 260 may display additional information about the thermal image being displayed, such as the file size, the image size (total pixels, pixel height by pixel width, etc.), a thumbnail preview of the entire image, and/or the like. The output module 260 may allow the user to change color palettes and may change the display values based on the color palette selected.

Multiple thermal images may be displayed in different tabs, in different windows, and/or the like, for example to provide information about thermal trends over time. The output module 260 may align different images of a similar area using geographic coordinate information, a correlation function, user input, and/or the like. The user may be able to quickly switch between the aligned images and visually compare them. The output module 260 may include a thumbnail preview of a thermal image from another window and/or a portion thereof. The output module 260 may display corresponding and/or difference information from an aligned image, such as temperature values, geographic coordinates, and/or the like for a pixel corresponding to a user selected pixel. The output module 260 may be configured to generate reports based on one or more thermal images. The generated reports may include temperature profiles (e.g., a statistical summary of temperature information) of a selected area (e.g., an area smaller than the whole area of the thermal image) and/or the entire area of the one or more thermal images; differences between selected areas and/or the entire area of the thermal images (e.g., a statistical summary of differences, an image displaying differences, etc.); size information (e.g., a geographic size of a selected area, a geographic size of areas at a particular temperature, etc.); and/or the like. The generated reports may be saved to the persistent storage device 205, for example, in portable document format (PDF).

The output module 260 may allow the user to select a pixel using the input device 203, such as a pixel with an unknown temperature value. The output module 260 may request the temperature of the pixel from the temperature modeling module 250. The temperature modeling module 250 may use the best fit curve to compute the temperature at the selected pixel from the display value for that pixel. The output module 260 may display the computed temperature to the user. The computed temperature may be displayed in a left, right, top, and/or bottom margin; a title bar; a pop-up window; a pop-up tag; a pane; and/or the like. In some embodiments, the thermal image and a description of the best fit curve (e.g., an indication of the form of the curve and/or a mathematical description of the curve parameters) may be saved to a persistent storage device 205 by the previously discussed modules. For example, the thermal image may be saved in an image file format, and the description of the best fit curve may be saved to a separate file as metadata for the image. The output module 260 and/or the temperature modeling module 250 may load the saved thermal image and the saved description of the best fit curve for displaying the thermal image and temperature values to the user. A graphical representation of the best fit curve may or may not be displayed to the user, and/or the user may be able to choose whether to view the best fit curve.

The output module 260 may also permit the user to manipulate the thermal image and/or the best fit curve. For example, the output module 260 may provide brightness and/or contrast controls to the user. In an embodiment, the brightness may be adjusted by multiplying/dividing or adding/subtracting a fixed value to each display value, and the contrast may be adjusted by stretching and/or shrinking the display values relative to a center point (e.g., subtracting half the range of display values, multiplying/dividing by a fixed value, and adding half the display value range). Because the display values have been modified, the best fit curve may also need to be modified. The output module 260 may reverse any brightness and/or contrast changes to the display values prior to passing the display value to the temperature modeling module 250, and/or the temperature modeling module 250 may modify the best fit curve to include the inverse of the brightness and/or contrast adjustments. Any other changes to the display values and/or color palette may require similar corrections.

A highlighting module 270 may be configured to distinctively mark pixels with temperature values within a temperature range of interest. The user may input the temperature range of interest by typing the temperature range, clicking on pixels at the temperatures of interest, and/or the like. The pixels with temperature values within the temperature range of interest may be distinctively marked (e.g., marked with a non-grayscale color), and the output module 260 may display the marked pixels. Pixels outside the temperature range of interest may be left unchanged and/or may be modified to contrast with the marked pixels (e.g., changed to black, white, or a different contrasting color). The in-range pixels may be marked in various ways, such as by one or more non-grayscale colors on a grayscale background, one or more non-grayscale colors on a solid colored background, white on a black background, black on a white background, one or more grayscale colors on a solid colored background, distinctively patterning the in-range pixels, flashing and/or alternating colors of the in-range pixels, and/or the like.

The highlighting module 270 may distinctively mark the in-range pixels with a gradient based on the location of the temperature value for each pixel within the temperature range of interest. In an embodiment, pixels with temperature values inside the temperature range and near the colder end of the range may be marked blue, and pixels with temperature values inside the temperature range and near the hotter end of the range may be marked red. Varying shades of blue, red, and/or purple may be used to mark pixels based on the locations of the temperature values within the temperature range of interest. Alternative color palettes may be used in other embodiments, and/or the user may be able to select a desired color palette. The highlighting module 270 may allow the user to quickly locate and assess areas of interest in the thermal image.

The system 200 may include a location interpolation module 280 configured to compute geographic location information for pixels. The location interpolation module 280 may receive indications of geographic locations (e.g., geographic coordinates) for one or more pixels for which the geographic location is known. The location interpolation module 280 may receive the indications of the locations from the georeferencing module 230, user input, and/or the like. The location interpolation module 280 may determine a location mapping for converting pixel coordinates to geographic locations, such as by solving a system of equations using pixel coordinates and geographic locations for the pixels with known geographic locations. Based on the location mapping, the location interpolation module 280 may compute the locations of pixels with unknown geographic locations from the pixel coordinates for those pixels. The output module 260 may display the computed locations for the pixels with the unknown locations.

Figure 3A:
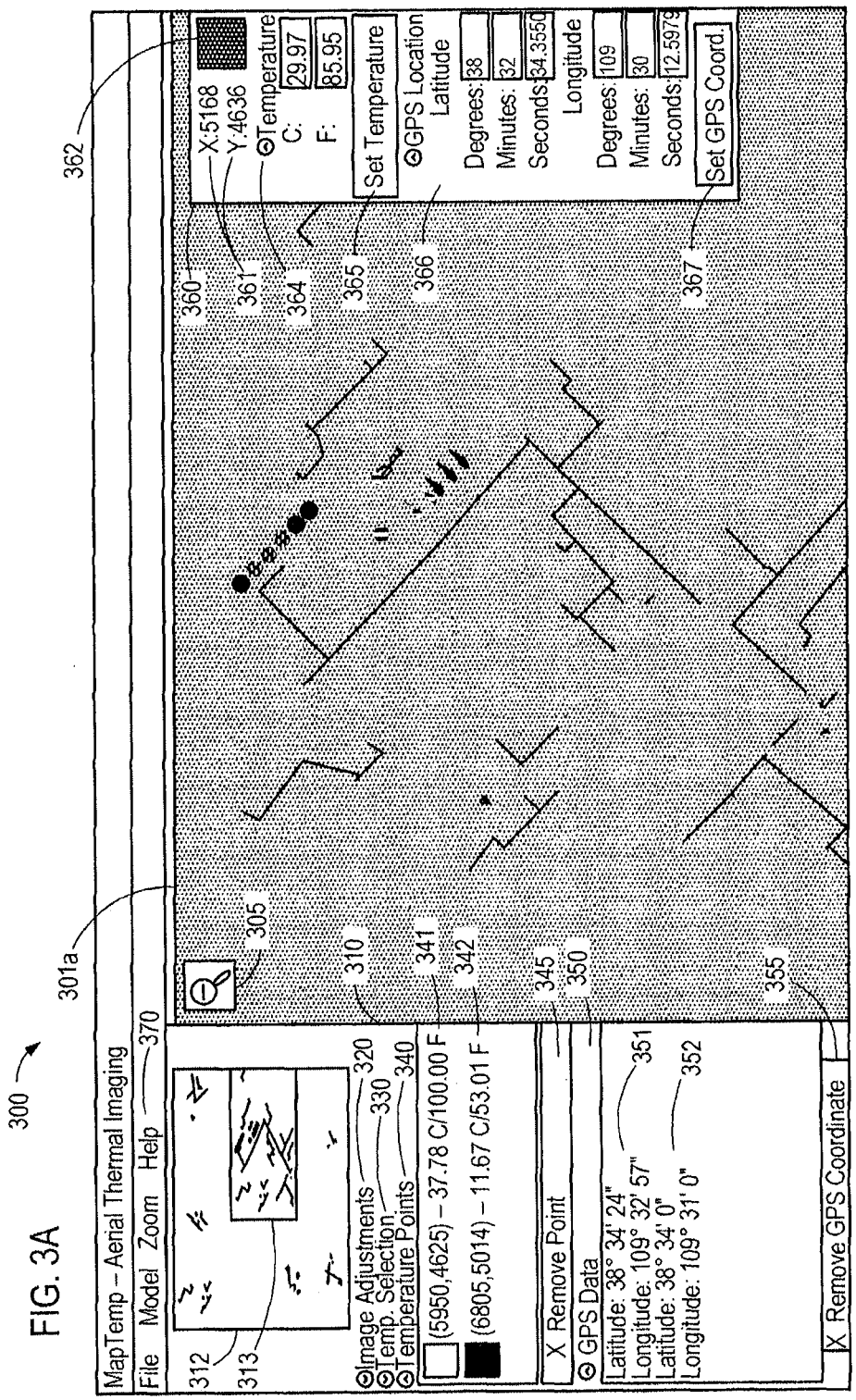
FIG. 3A is an exemplary screen display of a user interface produced on the output device by the output module.

FIG. 3A is an exemplary screen display of a user interface 300 produced on the output device 204 by the output module 260. The exemplary user interface 300 may display a section of a temperature accurate thermal image 301a (e.g., a stitched thermal image; an individual, non-stitched thermal image; and/or the like), which may be the whole thermal image or less than the whole thermal image. The user interface 300 may indicate temperature differences at various pixels in the thermal image section 301a by displaying the pixels with grayscale values corresponding to the temperature at the pixel. (In FIG. 3A, the varying grayscale values are illustrated through the use of different fill patterns.) The thermal image may be manipulated using control buttons, such as a zoom control 305, and/or the user may manipulate the image through mouse and/or keyboard (e.g., double-clicking to zoom, dragging the image 301a to pan, etc.). A side bar 310 may include a thumbnail preview 312 of the entire thermal image and an active selection indicator 313 marking the currently displayed thermal image section 301a relative to the entire thumbnail preview 312. The user may manipulate the active selection indicator 313 to change the area of the thermal image displayed.

The side bar 310 may include collapsible interfaces for various tools for manipulating the thermal image and/or thermal image section 301a, such as an image adjustment interface 320, a temperature selection interface 330, a temperature point interface 340, and a GPS data interface 350. The image adjustment interface 320 and temperature selection interface 330 are discussed in further detail below in conjunction with FIG. 3B. The temperature point interface 340 may indicate known temperature points 341, 342 used to create the temperature model and determine grayscale values for the thermal image section 301a. The temperature point interface 340 may indicate the color, pixel location, and/or temperature value for the known temperature points 341, 342. A "Remove Point" button 345 may allow temperature points 341, 342 selected by the user to be removed. The GPS data interface 350 may indicate a plurality of geographic coordinates 351, 352 for pixels with known locations, which can be used to interpolate geographic coordinates for pixels. The GPS data interface 350 may indicate the pixel location, geographic coordinates, and/or the like for the geographic coordinates 351, 352 of the pixels with known locations. A "Remove GPS Coordinates" button 355 may allow geographic coordinates 351, 352 selected by the user to be removed. The known temperature points 341, 342 and/or the geographic coordinates 351, 352 may be input by the user and/or loaded from a storage device.

A pixel information pane 360 may allow the user to interact with a selected pixel. The user may select a pixel of interest, for example, by clicking on the pixel with a mouse. The pixel information pane 360 may display coordinates 361 specifying the pixel location and display a pixel shade box 362 that has been filled using the display value for the selected pixel. A temperature indicator 364 may display the temperature value for the selected pixel in Kelvin, Celsius, and/or Fahrenheit. The temperature indicator 364 may also allow the user to input a temperature value for the selected pixel. A "Set Temperature" button 365 may save the pixel coordinates 361 and input temperature value as a temperature point 341, 342 used to create the temperature model and determine grayscale values. A location indicator 366 may display the geographic coordinates of the selected pixel. The location indicator 366 may also allow the user to input geographic coordinates for the selected pixel. A "Set GPS Coord." button 367 may save the pixel coordinates 361 and input geographic coordinates as geographic coordinates 351, 352 used to interpolate geographic coordinates for pixels.

The user interface 300 may include a menu bar 370 to provide various options to the user. The menu bar 370 may include various menus, such as "File," "Model," "Zoom," "Help," and/or the like. The "File" menu may allow the user to load images and/or image metadata, save images and/or image metadata, terminate the user interface, and/or the like. The "Model" menu may include various temperature models that can be used to interpolate/extrapolate unknown temperature values, and the user may select the temperature model to use. The "Zoom" menu may provide controls allowing the user to adjust the zoom, panning, orientation, and/or the like for the thermal image section 301a displayed. A "Help" menu may provide information about the user interface 300 and/or instructions on how to operate the user interface 300.

Figure 3B:
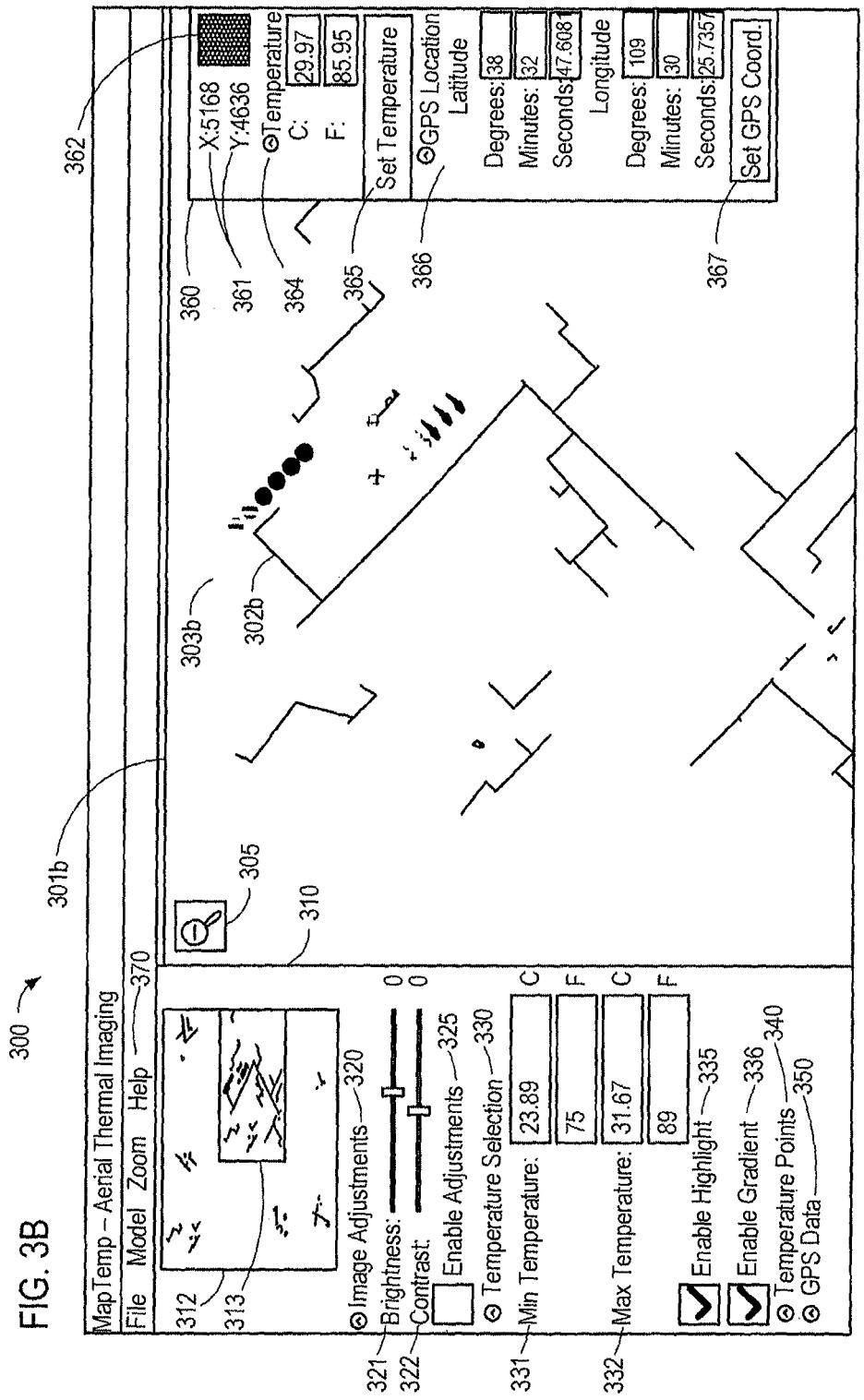
FIG. 3B is another exemplary screen display of the user interface produced on the output device by the output module.

FIG. 3B is another exemplary screen display of the user interface 300 produced on the output device 204 by the output module 260. The image adjustment interface 320 and the temperature selection interface 330 have been expanded to allow user interaction. The image adjustment interface 320 may include a brightness slider 321 and a contrast slider 322 that allow brightness and contrast of the thermal image section 301b to be adjusted. The user interface 300 may adjust the display values for the pixels and/or the display value to temperature mapping based on the adjustments to the sliders 321, 322. For example, an updated display value may be calculated for each pixel. To speed computation, only display values for the pixels in the thermal image section 301b being displayed may be computed, and display values for other pixels may be ignored until the user changes the thermal image section 301b being displayed. An "Enable Adjustments" checkbox 325 may apply the adjustments when checked thereby allowing the user to quickly switch between an unadjusted view and an adjusted view.

A temperature selection 330 interface may allow the user to display highlighting and/or temperature gradients on the thermal image section. A minimum temperature box 331 may allow the user to input a minimum temperature for highlighting, and a maximum temperature box 332 may allow the user to input a maximum temperature for highlighting. An "Enable Highlight" checkbox 335 may apply the highlighting to the thermal image section 301b. Pixels with temperature values between the minimum and maximum temperatures input by the user may be distinctively marked (e.g., distinctively marked pixels 302b). Pixels with temperature values outside the temperature range may be ignored and/or modified to contrast with the distinctively marked pixels (e.g., contrastingly marked background pixels 303b). The temperature range may be inclusive or exclusive, and/or inclusivity may be selected by the user depending on the embodiment. The temperature values for the pixels may be compared pixel-by-pixel with the temperature range to determine highlighting. Only pixels in the displayed thermal image section may be compared and/or highlighted to improve computation speed. An "Enable Gradient" checkbox 336 may allow the user to choose whether to highlight the in-range pixels with a single color or to highlight with varying color shades based on the locations of the temperature values for the in-range pixels in the temperature range.

Figure 4:
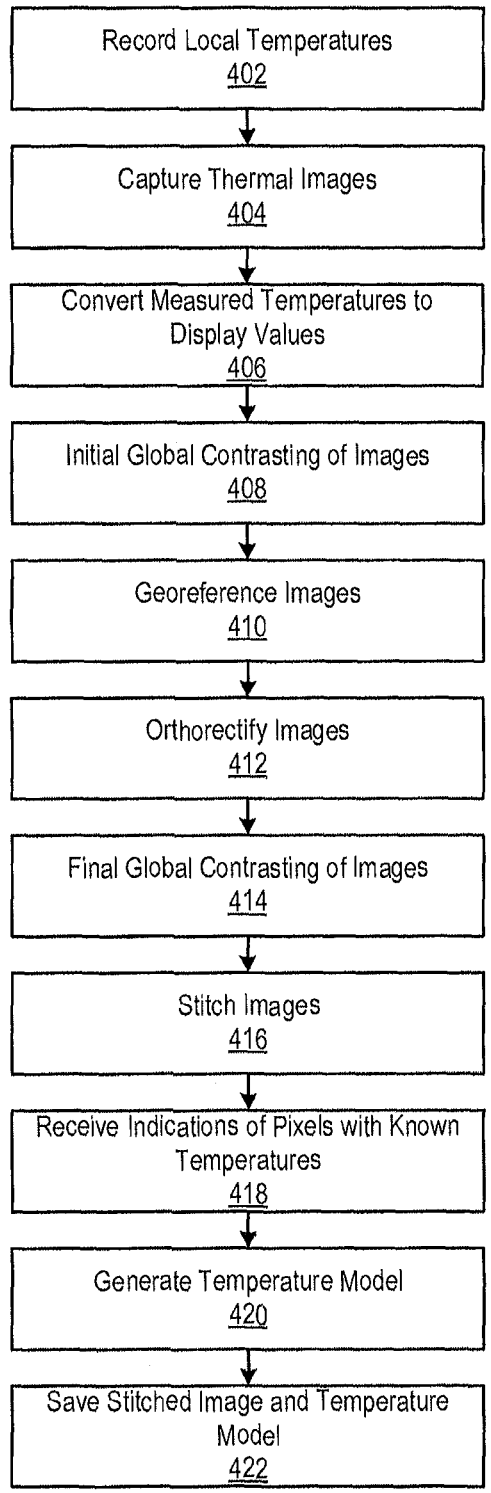
FIG. 4 is a flow diagram of a method for producing a temperature-accurate thermal image.

FIG. 4 is a flow diagram of a method 400 for producing a temperature-accurate thermal image. Local temperatures may be recorded 402 for a plurality of known locations. The local temperatures may be recorded 402 at an instant in time, several instants in time, over a period of time, and/or the like. Humidity, sunlight intensity, geographic location, and/or the like may be recorded as well. Aerial thermal images of an area of interest may be captured 404. The aerial thermal images may be captured 404 before, after, and/or at the same time as the local temperatures measurements. A thermal image sensor, such as a microbolometer, may be used to capture 404 the thermal images by measuring intensity of EM radiation (e.g., long wavelength infrared radiation). The thermal image sensor may convert measured intensities to measured temperature values, and each pixel in the captured thermal images may be expressed as a temperature value.

The measured temperature values for the captured thermal images may be converted 406 into display values that enable a display device to render the thermal image. Converting 406 the measured temperature values to display values may include determining a value range for the measured temperature values in a thermal image and mapping the temperature range to a range of possible display values using a mathematical function. The mapping from temperature to display value may vary between different thermal images, so initial global contrasting 408 of the captured thermal images may be performed to create a consistent mapping from temperature to display value for all the captured thermal images. A mathematical function with an easily calculated, injective inverse for the temperature range may be used for the global mapping. Alternatively, or in addition, the global contrasting may correct contrasting by comparing one or more statistical characteristics between constituent images and modifying the statistical characteristics to be consistent. The resulting images from initial global contrasting 408 may use consistent display values to represent the same temperature values.

The global contrasted thermal images may be georeferenced 410 and/or orthorectified 412. Georeferencing 410 may include aligning the thermal images to a spatially accurate base map to remove distortion of spatial distances that may result from terrain features and/or the angle of the thermal image sensor. Points on the thermal images may be pinned to corresponding features on the spatially accurate base maps with the remaining features stretched, skewed, and/or the like. Orthorectification 412 may include manipulating the thermal images to provide an overhead perspective of the ground. Sides of objects and/or terrain features (e.g., buildings, hills, etc.) may be removed and/or shrunk, and areas of the ground obscured by objects may be added, for example, by using information from other images. A digital elevation model of the terrain may allow the amount of distortion from particular features to be determined and corrected. Georeferencing 410 and orthorectification 412 may be performed at the same time and/or may be performed in a different order. Alternatively, or in addition, georeferencing 410 and/or orthorectification 412 may not be performed in some embodiments.

There may be significant overlap of the thermal images, so georeferencing 410 and/or orthorectification 412 may be done only for sections of the thermal images that will be used to produce a stitched image. For example, the images may be initially arranged according to location, and the best images and/or sections of images may be selected automatically and/or manually for use in the stitched image. The initial global contrasting, georeferencing, and/or orthorectification may be performed only on the images and/or sections of images that will be used in the stitched image. Final global contrasting 414 of the georeferenced and orthorectified images may correct any remaining contrasting problems. The images that will be used to produce the stitched image may be determined during final global contrasting 414, which may include automatic and/or manual swapping of which images and/or sections of images will be used. For example, the processor and/or the user may determine if there are problems with the images to be used, such as contrast problems (e.g., display value mismatches along seams, neighboring images for which the statistical characteristics should not be consistent, etc.), focus problems, and/or the like. The georeferencing 410 and/or orthorectification 412 steps and/or the swapping of images may introduce contrasting errors, so corrections may be made so the mapping from temperature to display value is consistent for any added pixels, images, and/or sections of images.

A complete, stitched thermal image may be created by stitching 416 the constituent images and/or image sections selected to form the stitched image. The constituent images and/or image sections may be automatically and/or manually aligned. Stitching lines along which the constituent images will be cut and connected to one another may be selected and the constituent images may be combined along the stitching lines. Alternatively, or in addition, the overlapping portions of the constituent images may be blended to combine the constituent images. The complete thermal image may be a single, seamless image that covers the entire area of interest that was captured by the thermal image sensor. Steps 406-416 may be performed in many possible orders and some steps may be omitted or split into several non-contiguous stages as will be recognized by those of skill in the art. For example, a single thermal image that does not need to be stitched may be captured 404 in some embodiments, and step 416 may be omitted.

Indications of pixels with known temperatures may be received 418 as well as temperature values for the pixels. The indications of the pixels may be specified as pixel coordinates, geographic coordinates, and/or the like. In an embodiment, the user may be able to click the pixel with known temperature to indicate it. The temperature values for the pixels with known temperature may be specified in Kelvin, Celsius, Fahrenheit, and/or the like. The temperature values may be known from the local temperature measurements. Alternatively, or in addition, the measured temperature values may be extracted from the aerial thermal images prior to converting 406 the measured temperature values to display values, and step 402 may be omitted.

A temperature model may be generated 420 from the indications of the pixels and the corresponding temperature values. The temperature model may be a best fit curve fitted to the display values of the indicated pixels and the corresponding temperature values. The best fit curve may be selected to have a form similar to the inverse of the consistent mapping from temperature to display value created in step 408. The temperature model may be generated 420 by finding a best fit curve that minimizes the least square error, minimizes the absolute error, minimizes the maximum error, and/or the like between the best fit curve and the temperature values of the known temperature pixels at the corresponding display values. In some embodiments, the temperature model may map raw measurements (e.g., resistances, intensities, etc.) to temperatures.

The complete thermal image and the generated temperature model may be saved 422, for example, to a persistent storage device. The complete thermal image may be saved in an image file format (e.g., an uncompressed, compressed, lossy, and/or lossless format and/or the like). In some embodiments, raw measurements for each pixel from the thermal image sensor may be saved. The temperature model may be saved to a metadata file separate from the image. In some embodiments, location information, display values, and/or temperature values for the known temperature pixels may be saved with an indication of the form of the best fit curve. Parameters specifying the best fit curve may not be saved, and step 420 may not need to be performed. Alternatively, or in addition, the mathematical parameters computed to describe the curve may be saved to the metadata file.

Figure 5:
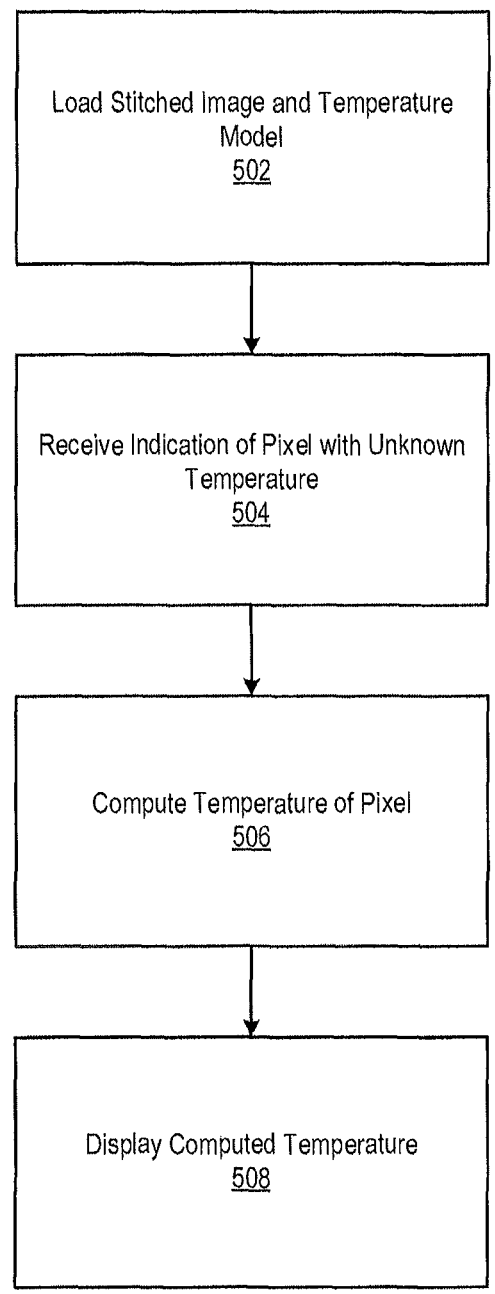
FIG. 5 is a flow diagram of a method for determining a temperature at a pixel.

FIG. 5 is a flow diagram of a method 500 for determining a temperature at a pixel. The method 500 may begin with loading 502 a thermal image, such as a previously saved complete thermal image, and loading a temperature model if the thermal image and temperature model have not been loaded already. In embodiments where saving the temperature model does not include saving the mathematical parameters of a best fit curve, loading 502 the temperature model may include generating a temperature model from an indication of the form of the best fit curve and/or the location information, display values, and/or temperature values for pixels with known temperatures.

An indication of a pixel with an unknown temperature may be received 504. The indication of the pixel may include pixel coordinates, geographic coordinates, clicking by the user on the pixel, and/or the like. The temperature of the pixel with the unknown temperature may be computed 506 using the temperature model. The display value for the pixel with the unknown temperature may be determined from the indication of the pixel, and the temperature may be calculated by inputting the display value into the formula for the best fit curve. The computed temperature for the pixel with the unknown temperature may be displayed 508. Additional information about the pixel may also be displayed, such as the pixel coordinates, geographic coordinates, and/or display value. In some embodiments, the temperature of the pixel may be computed based on raw measurements associated with that pixel.

Figure 6:
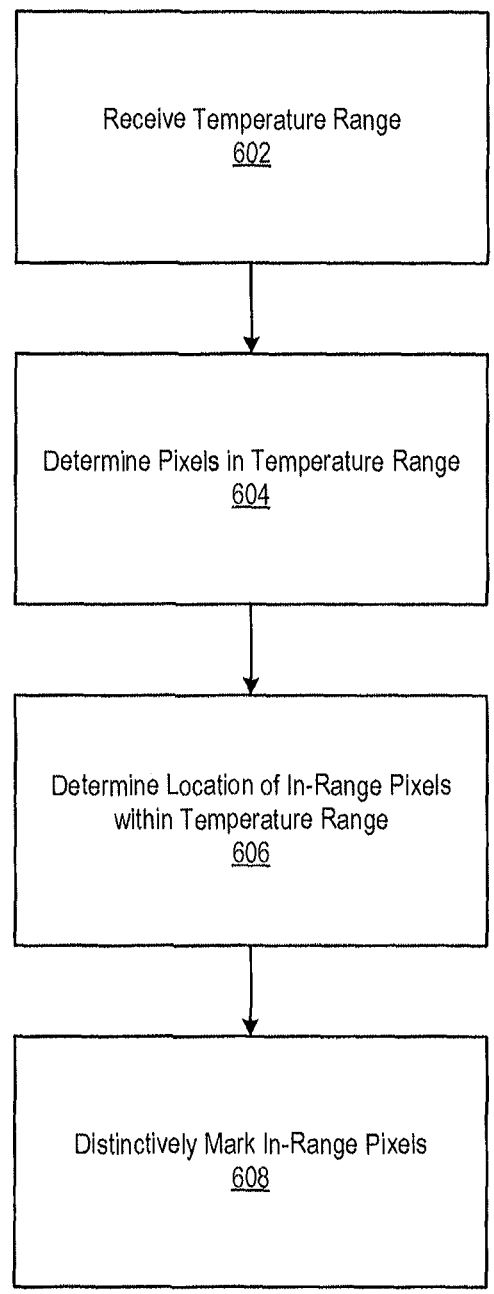
FIG. 6 is a flow diagram of a method for distinctively marking pixels within a temperature range of interest.

FIG. 6 is a flow diagram of a method 600 for distinctively marking pixels within a temperature range of interest. A thermal image and temperature model may have been loaded previously. A temperature range of interest may be received 602, for example from a user and/or by loading the temperature range from a file. Step 604 may include determining which pixels have temperature values in the temperature range. Each pixel in the thermal image and/or each pixel that is currently being displayed may be compared to the temperature range to determine if the temperature value of the pixel is in the temperature range.

If marking the pixels includes marking the pixels with a gradient, the location of the temperature value of each in-range pixel within the temperature range may be determined 606. The location may be computed by comparing the temperature value to the minimum and/or maximum values for the temperature range. The in-range pixels may be distinctively marked 608, which may include modifying out-of-range pixels to contrast with the in-range pixels. If the pixels are not being marked with a gradient, all the pixels may be marked by changing them to a same non-grayscale color. If a gradient is being marked, colors for pixels may be determined based on their location within the temperature range. For example, a blue component of the color may be largest for temperature values near the minimum value of the temperature range and may decrease linearly to a smallest value for temperature values near the maximum value whereas a red component of the color may be smallest for temperature values near the minimum value and may increase linearly to a largest value for temperature values near the maximum value. Steps 604-608 may be performed pixel-by-pixel with all the steps being performed on each pixel before being performed on the next pixel. Alternatively, each step may be performed on every pixel before the next step is performed.

Figure 7:
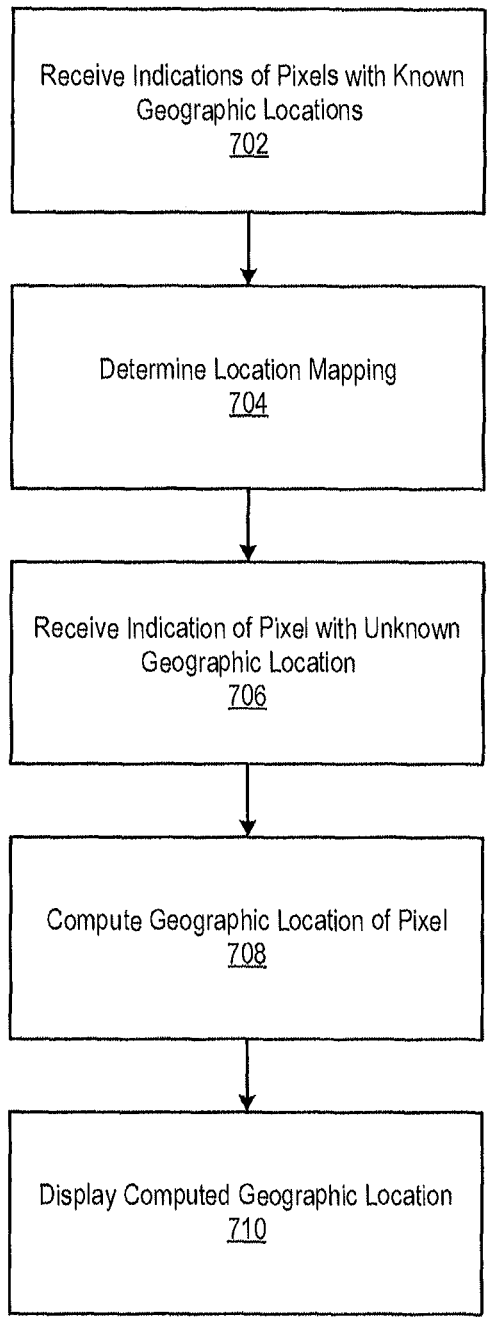
FIG. 7 is a flow diagram of a method for determining geographic coordinates of a pixel.

FIG. 7 is a flow diagram of a method 700 for determining geographic coordinates of a pixel. A thermal image and temperature model may have been loaded previously. Indications of pixels with known geographic locations may be received 702 as well as geographic coordinates for the pixels. The indications may include pixel coordinates, clicking by the user on the pixel, and/or the like. Based on the pixel locations and the geographic coordinates, a location mapping from pixel location to geographic coordinates may be determined 704. In an embodiment, the mapping may be assumed to be linear, and the location mapping may be determined 704 by solving a linear system of equations generated from pixel coordinates and corresponding geographic coordinates. The system of equations may have a unique solution that can be calculated, and/or the system of equations may be overdetermined and a solution that minimizes error may be calculated. An equation for geographic coordinates as a function of pixel coordinates may be generated from the solution.

An indication of a pixel with an unknown geographic location may be received 706. The indication of the pixel may include pixel coordinates, clicking by the user on the pixel, and/or the like. The geographic coordinates for the pixel may be computed 708, for example, using the equation determined in step 704. The pixel coordinates for the pixel with the unknown geographic location may be input into the equation and the geographic coordinates for the pixel may be calculated. The computed geographic coordinates may be displayed 710. Additional pixel information may be displayed as well, such as pixel coordinates, display value, temperature value, and/or the like.

The systems disclosed herein (e.g., the system 200) may be implemented as a computer system. Embodiments may include various steps, which may be embodied in machine-executable instructions to be executed by a computer system. A computer system includes one or more general-purpose or special-purpose computers (or other electronic devices). Alternatively, the computer system may include hardware components that include specific logic for performing the steps or include a combination of hardware, software, and/or firmware. Without limitation, a computer system may include a workstation, laptop computer, disconnectable mobile computer, server, mainframe, cluster, so-called "network computer" or "thin client," tablet, smartphone, personal digital assistant or other hand-held computing device, "smart" consumer electronics device or appliance, or a combination thereof. A server may include a physical server, a server cluster, a distributed server, a virtual server, a cloud server, a computer providing resources to one or more clients, a combination of one or more of the aforementioned, and/or the like. Some or all of the functions, steps, and/or operations discussed herein may be performed by one or more clients rather than a server. Those of skill in the art will realize many possible divisions of operations between servers and clients.

Each computer includes at least a processor and a memory; computers may also include various input devices and/or output devices. The processor may include one or more general-purpose central processing units (CPUs), graphic processing units (GPUs), or Digital Signal Processors (DSPs), such as Intel®, AMD®, Nvidia®, ATI®, TIC), or other "off-the-shelf" microprocessors. The processor may include a special-purpose processing device, such as an ASIC, PAL, PLA, PLD, FPGA, or other customized or programmable device. The memory may include static RAM, dynamic RAM, flash memory, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The one or more computers may be capable of using a floppy drive, tape drive, optical drive, magneto-optical drive, memory card reader, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Embodiments may also be provided as a computer program product, including a non-transitory machine-readable storage medium having stored thereon instructions that may be used to program a computer (or other electronic device) to perform processes described herein. The non-transitory machine-readable storage medium may include, but is not limited to, hard drives, floppy diskettes, optical disks, CD-ROMs, DVD-ROMs, ROMs, RAMs, EPROMs, EEPROMs, magnetic or optical cards, tapes, solid-state memory devices, or other types of media/machine-readable media suitable for storing electronic instructions.

Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. One suitable network includes a server and several clients; other suitable networks may contain other combinations of servers, clients, and/or peer-to-peer nodes, and a given computer may function both as a client and as a server. Each network includes at least two computers and/or computer systems, such as servers and/or clients.

The network may include communications or networking software, such as the software available from Novell, Microsoft, Artisoft, and other vendors, and may operate using TCP/IP, SPX, IPX, and other protocols over twisted pair, coaxial or optical fiber cables, telephone lines, satellites, microwave relays, modulated AC power lines, physical media transfer, and/or other data transmission "wires" or wireless networks known to those of skill in the art. The network may encompass smaller networks and/or be connectable to other networks through a gateway or similar mechanism.

Suitable software to assist in implementing the invention is readily provided by those of skill in the pertinent art(s) using the teachings presented here and programming languages and tools, such as Java, Pascal, C++, C, PHP, JavaScript, Python, C#, Perl, SQL, Ruby, Shell, Visual Basic, Assembly, Action Script, Objective C, Lisp, Scala, Tcl Haskell, Scheme, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, comprise one or more physical or logical blocks of computer instructions, which may be organized as a routine, a program, a script, an object, a component, a data structure, etc., that perform one or more tasks or implement particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that may be used according to the present invention is already available, such as general-purpose computers, computer programming tools and techniques, computer networks and networking technologies, and digital storage media.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure. The scope of the present disclosure should, therefore, be determined only by the following claims.

The invention claimed is:

1. A method for generating a composite infrared image, comprising:
   receiving image data corresponding to a plurality of infrared images, wherein each of the infrared images corresponds to a subset portion of a geographical feature, such that joining the plurality of infrared images forms a composite infrared image of the geographical feature;
   determining a global contrast range for the composite infrared image, the global contrast range having a global minimum contrast value corresponding to a minimum infrared intensity value of the plurality of infrared images and a global maximum contrast value corresponding to a maximum infrared intensity of the plurality of infrared images;
   mapping a contrast level of at least one of the plurality of infrared images based on the determined global contrast range for the composite infrared image; and
   generating a composite infrared image of the geographical feature based on the plurality of mapped images that retains distinguishable intensity variations for each of the infrared images used for the composite image.

2. The method of claim 1, wherein a minimum value of the contrast level of at least one of the plurality of infrared images is mapped to be equal to the global minimum contrast value.

3. The method of claim 1, wherein a maximum value of the contrast level of at least one of the plurality of infrared images is mapped to be equal to the global maximum contrast value.

4. The method of claim 1, wherein mapping the contrast level of at least one of the plurality of infrared images comprises scaling an individual infrared intensity range of each thermal image to match the global contrast range.

5. The method of claim 1, wherein the geographical feature comprises at least one of a geographical region of land, a building, a rooftop, a structure, and a cityscape.

6. The method of claim 1, further comprising receiving the global contrast range from a user.

7. The method of claim 1, wherein generating a composite infrared image comprises exporting a digital image file.

8. The method of claim 1, further comprising determining the global contrast range based on a maximum infrared intensity of the plurality of infrared images.

9. A system comprising:
   a processor;
   an infrared imaging device configured to capture image data corresponding to a plurality of infrared images, wherein each of the infrared images corresponds to one of at least a portion of a building and a landscape feature, such that joining the plurality of infrared images forms a composite infrared image of the at least a portion of the building or the landscape feature; and
   a non-transitory memory in communication with the processor, the memory comprising instructions executable by the processor to:
      determine a global contrast range for the composite infrared image, the global contrast range having a global minimum contrast value corresponding to a minimum infrared intensity value of the plurality of infrared images and a global maximum contrast value corresponding to a maximum infrared intensity of the plurality of infrared images;

map a contrast level of at least one of the plurality of infrared images based on the determined global contrast range for the composite infrared image; and generate a composite infrared image of the at least a portion of the building or the landscape feature based on the plurality of mapped images, wherein the generated composite infrared image retains distinguishable intensity variations for each of the infrared images used for the composite image.

10. The system of claim 9, wherein the instructions are further configured to cause the processor to map a minimum value of the infrared range data for at least one of the plurality of infrared images to be equal to the global minimum contrast value.

11. The system of claim 9, wherein the instructions are further configured to cause the processor to map a maximum value of the infrared range data for at least one of the plurality of infrared images to be equal to the global maximum contrast value.

12. The system of claim 9, wherein the instructions are further configured to cause the processor to scale an individual infrared range of each infrared image to match the global contrast range.

13. The system of claim 9, wherein the instructions are further configured to cause the processor to exclude one or more extreme thermal values.

14. The system of claim 13, wherein the instructions are further configured to cause the processor to receive a user indicated infrared range outside of which infrared values should be excluded.

15. The system of claim 13, wherein the instructions are further configured to cause the processor to automatically determine infrared values that should be excluded.

16. The system of claim 9, wherein the plurality of infrared images each include an initial contrast level determined from an individual infrared range.

17. The system of claim 9, wherein each of the infrared images corresponds to at least a portion of a building.

18. An infrared imaging system comprising:
a processor;
an infrared imaging device configured to capture image data corresponding to a plurality of infrared images, wherein each of the infrared images corresponds to one of at least a portion of a building and a landscape feature;
a means for joining the plurality of infrared images to form a composite infrared image of the at least a portion of the building or the landscape feature;
a means for identifying a fixed global contrast range for the composite infrared image, the global contrast range comprising a fixed minimum infrared intensity value and a fixed maximum infrared intensity value;
a means for mapping a contrast level of at least one of the plurality of infrared images based on the identified fixed global contrast range; and
a means for outputting the composite infrared image of the at least a portion of the building or the landscape feature based on the plurality of mapped images, wherein the generated composite infrared image retains distinguishable intensity variations for each of the infrared images used for the composite image.

19. The infrared imaging system of claim 18, wherein the fixed global contrast range is user-specified.

20. The infrared imaging system of claim 18, wherein each of the infrared images corresponds to a landscape feature.

* * * * *